United States Patent [19]
Eigen et al.

[11] Patent Number: 5,446,263
[45] Date of Patent: Aug. 29, 1995

[54] DEVICE FOR SETTING THE TEMPERATURE OF A SAMPLE SELECTIVELY TO DIFFERENT VALUES

[75] Inventors: Manfred Eigen, Göttingen; Hajo Otten, Esslingen, both of Germany

[73] Assignee: Max-Planck-Gesellschaft zur Förderung der Wissenschaften e.V., Germany

[21] Appl. No.: 671,749

[22] Filed: May 3, 1991

[30] Foreign Application Priority Data

Nov. 3, 1988 [DE] Germany .................. 8813773 U

[51] Int. Cl.⁶ .................. B01L 7/00; G05D 23/19
[52] U.S. Cl. .................. 219/521; 422/65; 422/67; 435/290; 432/153; 432/210; 432/121; 414/172; 219/388
[58] Field of Search .......... 219/521, 388, 385; 422/63, 64–66, 307, 308, 67; 435/290; 414/150, 172, 147; 432/11, 121, 128, 156, 153, 210, 230, 231, 262; 141/82

[56] References Cited

U.S. PATENT DOCUMENTS

| | | | |
|---|---|---|---|
| 3,684,452 | 8/1972 | Bessman | 23/253 |
| 3,721,805 | 3/1973 | Barratt | 219/492 |
| 3,770,382 | 11/1973 | Carter et al. | 435/290 |
| 3,801,467 | 4/1974 | Nobe et al. | 165/47 |
| 4,039,286 | 8/1977 | Keller et al. | 141/130 |
| 4,115,861 | 9/1978 | Allington | 422/105 |
| 4,632,808 | 12/1986 | Yamamoto et al. | 422/67 |
| 4,675,509 | 6/1987 | Hell | 219/528 |
| 4,727,032 | 2/1988 | Baisch et al. | 219/521 |
| 4,824,792 | 4/1989 | Thorpe et al. | 422/66 |
| 5,176,202 | 1/1993 | Richard | 435/290 |
| 5,224,536 | 7/1993 | Eigen et al. | 435/290 |
| 5,281,516 | 1/1994 | Stapleton et al. | 435/290 |

FOREIGN PATENT DOCUMENTS

| | | |
|---|---|---|
| 0122772 | 4/1984 | European Pat. Off. . |
| 2073836 | 12/1970 | France . |
| 2134730 | 1/1984 | United Kingdom . |
| 9204979 | 4/1992 | WIPO .................. 422/307 |

Primary Examiner—John A. Jeffery
Attorney, Agent, or Firm—Harness, Dickey & Pierce

[57] ABSTRACT

Device for setting the temperature of a sample selectively to different values comprising a sample holder block having good thermal conductivity properties and at least one recess (14) for receiving a sample whose temperature is to be adjusted, and a device for adjusting the temperature of a sample holder block, wherein the device for adjusting the temperature of the sample holder block (12) comprises at least two bodies (18, 20) whose temperatures can be controlled via separate thermostats and whose temperatures can be adjusted to different values and wherein a transporter (30, 32, 34) is provided by a way in which the sample holder block (12) can be brought into thermal contact with one of the bodies (18, 20).

10 Claims, 2 Drawing Sheets

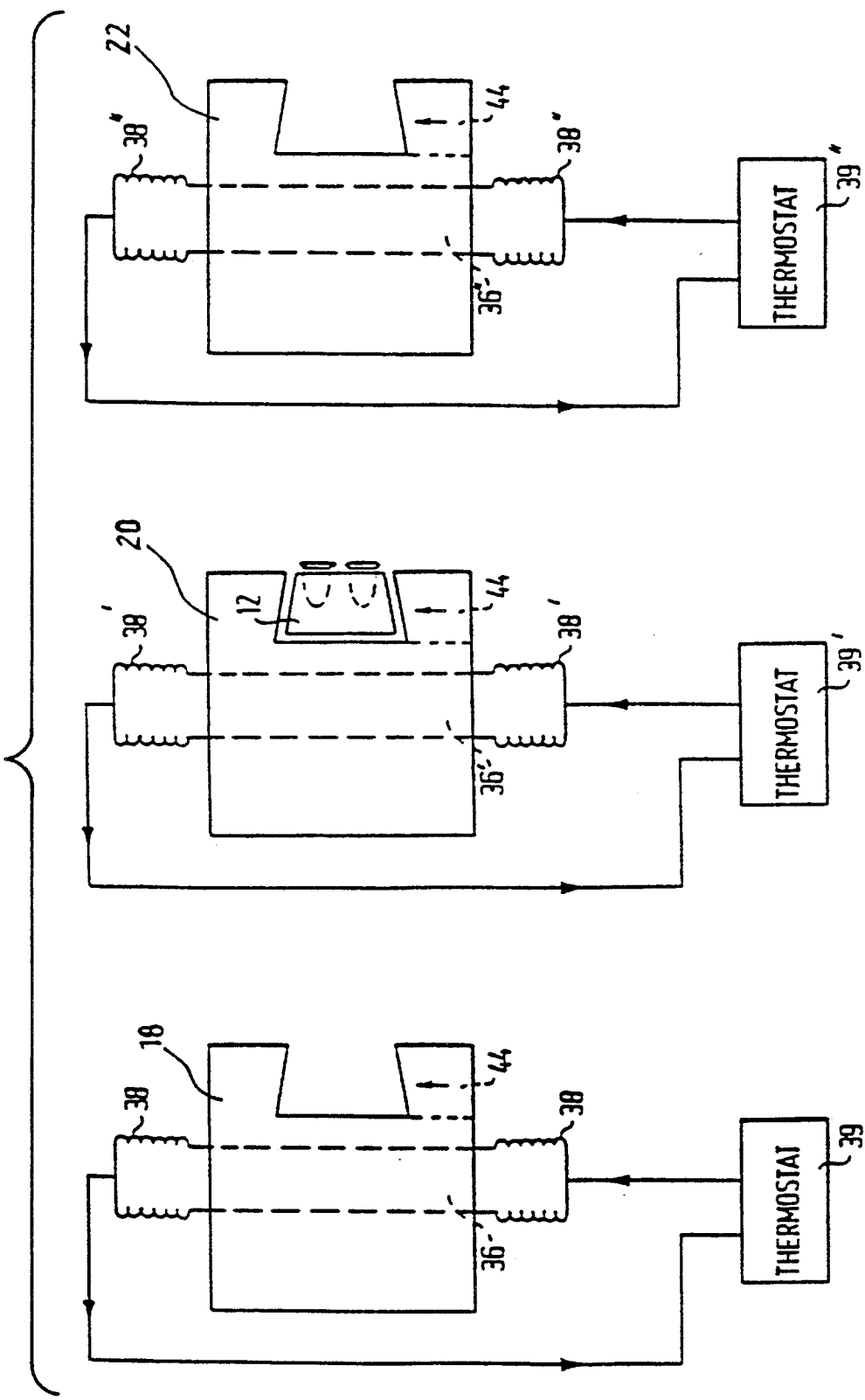

DEVICE FOR SETTING THE TEMPERATURE OF A SAMPLE SELECTIVELY TO DIFFERENT VALUES

BACKGROUND OF THE INVENTION

The present invention relates to a device for setting the temperature of at least one sample to different values, the device comprising a holder intended to receive the sample, temperature-adjusting means which are thermostatted to at least two different temperatures, transport means for the holder and a control system for the transport means, the arrangement being such that the sample can be brought into thermal contact selectively with any of the temperature-adjusting means.

A device of the afore mentioned kind is known from U.S. Pat. No. 4,632,808.

It is a requirement of many biochemical methods that the temperature of solutions must be changed quickly and in a reproducible way, for example for the purpose of heat-denaturating nucleic acids, annealing primers, starting or stopping enzymatic reactions, and the like. Frequently, it is also necessary for such reactions that a pre-determined temperature profile cycle be run through, which may comprise several heating-up or cooling-down phases. The duration of such an experiment may be up to several hours. Similar tasks are encountered also in other fields of science and technology.

It is desirable to automate such processes in order to take some of the load off the personnel and to guarantee reproducible conditions.

There have been known devices comprising a metal block which contains bores or recesses intended to receive reaction vessels made from a plastic material and whose temperature can be adjusted to the desired values. The reaction vessels are thermostatted by their contact with the walls of such bores; the contact may be improved by filling the bores with water or oil. The temperature of the metal block can be adjusted, for example, with the aid of heating cartridges which are controlled in response to a constantly operating water or convection cooling system. Another possibility consists in the use of Peltier elements for heating and cooling the metal block. Another known method for thermostatting the metal block consists in the use of thermostatting baths of different temperatures which can be selectively connected, via a valve system, with fluid channels provided in the metal block.

However, due to the considerable heat storage capacity of the metal block and of the system connected to the latter, it is rather difficult to achieve rapid temperature changes in the case of such set-ups.

The before-mentioned U.S. Pat. No. 4,632,808 describes a chemical manipulator which is capable of carrying out automatically a number of mixing, separating, heating and cooling steps. The device comprises for this purpose a centrifugal separator, four thermostat baths which are open at their tops, a drying system, a solution adding station, a mixing station and transport means. The transport means comprises a robot arm which is capable of being displaced in the three directions in space and which is controlled by a control system.

The samples to be examined are contained in plastic reaction vessels which can be accommodated in a box-like holder by groups of four. The known device uses a plurality of such holders which are transported by the robot arm to the different processing stations, as directed by the control. For heating or cooling the samples, the holders are dipped into the desired thermostat bath which latter contains suitable means for receiving the holders.

With the aid of this arrangement, the temperature change can be brought about in the samples only slowly due to the fact that the movement which the robot arm has to perform in order to pick up the holder from one thermostat bath and suspend it in another thermostat bath is along several axes and, thus, slow. Consequently, the time between the removal of the holder from one bath, and its introduction into the next thermostat bath is far too long as to permit, for example, to stop enzymatic reactions within the required short time of a few seconds.

In addition, it is a disadvantage of the known device that the samples get into thermal contact with the ambient air on their way between two thermostat baths. If the samples are to be heated up, for example, from 70° Centigrade to 90° Centigrade, as is the case with many enzymatic reactions where such temperature changes have to be brought about cyclically, the samples which have been heated up to 70° Centigrade will be cooled down excessively on their way through the air. This has a negative influence on the yield of the reaction.

The open thermostat baths lead in addition to problems due to splashing or dripping of the bath liquid.

From U.S. Pat. No. 3,801,467 there has been known a vibrator for cultivating microorganisms where an aluminium block is set into vibrating movement. The aluminium block is heated on its one end and cooled on its other end so that a temperature gradient develops along the block. The block is further provided with grooves extending in parallel to its longitudinal direction, i.e. in the direction of the temperature gradient, and further with a plurality of bores. It is said that in the case of the known device only short time is required for building up the temperature gradient so that a broad and continuous temperature range is made available for cultivating the microorganisms.

The grooves and bores serve for accommodating steel Petri dishes or glass flasks containing the microorganisms to be cultivated. The Petri dishes or glass flasks can be inserted into the grooves or bores in those positions which have the correct temperature required for the respective cultivation task. It is thus possible to incubate several cultures at different temperatures all at the same time.

Changing the temperature of the cultures during the incubation is not envisaged, and would in fact take far too much time, for example for enzymatic reactions, due to the fact that the cultivating vessels consist of steel or glass.

U.S. Pat. No. 3,684,452 describes a device for carrying out analytical processes, in particular for incinerating reagents. In the case of this known device, test tubes containing solutions are held and indexed through their path by an indexing table, an endless conveyor or conveyor chain. One of the stations is equipped with a stationary heating channel through which the test tubes are carried by the transport means. On their way through the channel, the test tubes project downwardly into the U-shaped heating channel which is open at its ends and whose side walls and bottom are equipped with heating coils.

The tubes and, thus, the solutions are heated up by the radiation from the heating coils, the latter being arranged in such a way that the heat increases as the tubes are transported further along and into the channel. The heating channel is followed by a washing and rinsing station where the test tubes are cleaned after incineration of the solutions so that they are immediately available for further use.

This known device does not, however, permit cyclical heating up and cooling down.

U.S. Pat. No. 4,675,509 describes a bonding press for bonding together flat pieces of textile materials, in particular linings or skin materials. The known device comprises a heating station having a plurality of heating zones provided with electric heatings which can be switched on and off selectively so as to enable a desired temperature distribution to be adjusted as a function of space and/or time. The heatings consist of flexible heating mats with embedded heating wires. The pieces of textile material are moved along the heating mats, are heated up by their contact with the latter and are bonded together subsequently.

This known bonding press is not suited for carrying out biochemical processes.

BRIEF SUMMARY OF THE INVENTION

Starting out from the described state of the art, it is the object of the present invention to improve a device of the kind mentioned before in such a way as to eliminate the disadvantages that have been described above. In particular, the improved device, while exhibiting a simple structure, is to enable temperature changes to be effected quickly, in a reproducible way and cyclically, on at least one sample.

The invention solves this object by an arrangement wherein the holder comprises a thermally conductive sample holder block provided with recesses intended to receive the sample in thermally conductive relationship, the temperature-changing means comprise at least two rigid thermally conductive temperature blocks arranged along one coordinate, the transport means moves the sample holder block along the coordinate, and the control is a sequence control system and as such adapted to bring the sample holder block cyclically and sequentially into contact with the temperature blocks, for given periods of time, using the transport means.

This solves the object underlying the invention fully and perfectly. Given the fact that the sample holder block is moved along one coordinate only—along a straight line or along an arc of a circle-the movement between temperature blocks of diferent temperatures can be effected by simple constructive means; and above all very rapidly. In addition, given the thermal contact between the sample and the sample holder block on the one hand and between the sample holder block and the respective temperature block on the other hand, the sample assumes the temperature of the respective temperature block very rapidly. The temperature-changing means used according to the invention consist of rigid thermally conductive temperature blocks which permit a considerably quicker heat exchange than the liquids previously used in the art.

All this contributes towards effecting the temperature change in a sample rapidly and in a reproducible manner. The sequence control system ensures that the sample is run through a temperature profile cyclically and is maintained, for a predetermined period of time, at the temperature of that temperature block with which it is in contact at the respective time. There do not occur any undesirable temperature variations in the sample on its way between two temperature blocks, as on the one hand the transfer is effected very rapidly and, on the other hand, the temperature blocks are arranged one beside the other along the coordinate so that the distance to be passed is extremely small.

Moreover, in the case of the device according to the invention the heat storage capacity of the sample holder block, which comprises the recesses accommodating the samples and which usually consists of a metal, such as aluminium, can be kept relatively low so that the temperature of the sample holder block can be changed quickly. The transport means enables the sample holder block to be brought into contact, i.e. into thermal contact, selectively with any one of two or more temperature blocks, the latter being maintained at the different temperatures, to which the samples are to be brought, by suitable thermostatting means. Consequently, the temperature has to be changed only in a relatively small sample holder block, which is designed as a slide, so that the temperature change can be effected very quickly. The device is closed with respect to the thermostatting means so that any splashing or dripping problems are excluded.

A further improvement of the device according to the invention provides that means enhancing the thermal contact are provided which ensure that a thin air layer only is left between the sample holder block and the respective temperature block when the sample holder block occupies the position in which it contacts the temperature block.

This feature is of particular advantage because an oil layer between the sample holder block and the temperature block, for example, leads to a notable improvement of the heat transfer between the two elements, while an air layer, however thin, would notably deteriorate the heat transfer.

According to a further preferred feature, the means enhancing the thermal contact are adapted to press the sample holder block against the respective temperature block.

The contact pressure between the sample holder block and the temperature block can be achieved, for example, with the aid of springs or by application of a vacuum, which in either case provides efficient heat transfer and leads to a rapid temperature change in the sample holder block and, thus, the samples accommodated therein.

BRIEF DESCRIPTION OF THE DRAWINGS

Hereafter, a preferred embodiment of the invention will be discussed in more detail with reference to the drawing, giving due regard to still other features and advantages of the invention. In the drawing

FIG. 3 shows three simplified end views of the temperature blocks of the device according to FIG. 1.

DETAILED DESCRIPTION OF THE PREFERRED EMBODIMENT

Figure 1:
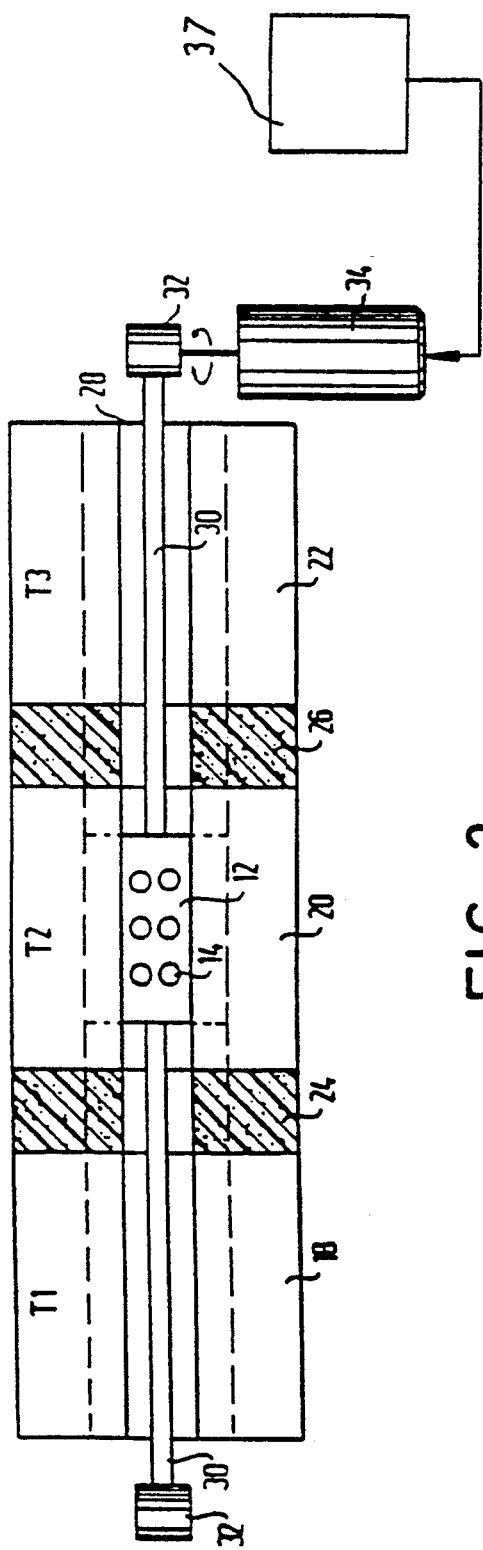
FIG. 1 shows a simplified top view of a device according to one embodiment of the invention.

The device illustrated in the drawing comprises a thermally conductive sample holder or sample receiving block 12 made from a metal of good thermal conductivity and provided with bores or recesses 14 which are intended to accommodate reaction or sample vessels 16. The device illustrated as one embodiment of the invention comprises in addition three bodies 18, 20, 22 capable of being thermostatted, which bodies may consist of a metal, have a relatively high heat storage capacity compared with the sample holder block 20 and can be maintained at three different temperatures T1, T2 or T3 by suitable thermostatting devices. The thermostatting bodies 18, 20, 22 are thermally insulated from each other by thermally insulating intermediate pieces 24, 26 consisting, for example, of expanded plastic.

The upside of the thermostatting bodies 18, 20, 22 is formed in the present case by a dovetail groove 28 in which the sample holder block 12, having a matching shape, is accommodated in sliding relationship. The displacement of the sample holder block 12 is effected by a toothed belt 30 running on guide pulleys 32, one of the latter being connected to a motor 34, for example a reversing stepping motor.

As can be seen best in FIG. 3, the thermostatting bodies 18, 20, 22 may comprise a channel 36 for circulating a heat transfer medium, which channel 36 may be provided with connections (olives) 38 for the heat transfer medium circuit of a thermostat 39. The channel may branch out and/or comprise baffles in the thermostatting body, or may generally be shaped in such a way that an eddy flow of the heat transfer medium is achieved and, thus, the best possible heat transmission is guaranteed. Each thermostatting body 18, 20, 22 is connected to its own thermostat 39, 39', 39'' so that it can be adjusted to its own particular temperature. It goes without saying that there is of course also the possibility to use other known means, such as heating cartridges, Peltier elements, or the like, for setting the temperature of the thermostatting bodies 18, 20, 22. The thermostatting bodies 18, 20, 22 are maintained at the same, constant temperature at least for the time of one test series, which guarantees great accuracy and high reproducibility of the temperature curve.

Figure 2:
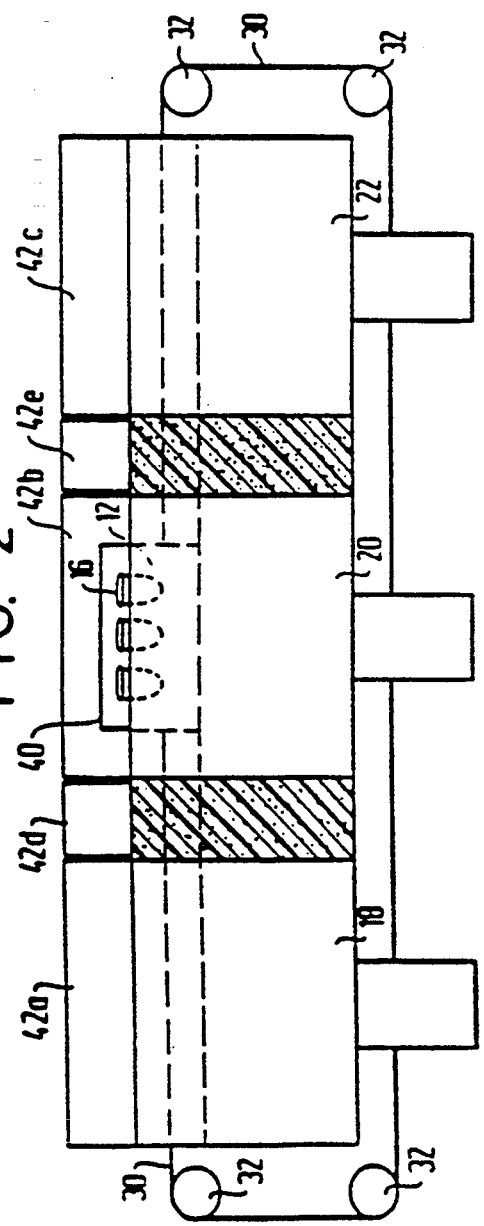
FIG. 2 shows a simplified side view of the device according to FIG. 1.

During operation, the sample holder block 12 is moved into thermal contact, by means of the motor 34 and the toothed belt 30, with that thermostatting body 18, 20, 22 whose temperature is equal to the desired sample temperature. The motor 34 is controlled by control means 37 adapted to bring the sample holder block 12 cyclically and sequentially into contact with the temperature blocks 18, 20, 22. When the temperature of the samples is to be changed, the sample holder block 12 is displaced along the groove 28, and introduced into that thermostatting body which has the desired new temperature. The accuracy and reproducibility of the temperature setting may be further improved by providing the sample holder block 12 and/or each of the thermostatting bodies 18, 20, 22 with a lid 40 or 42a, 42b, 42c, in order to guarantee efficient thermal insulation. As shown in FIG. 2, each of the thermostatting bodies or temperature block means 18, 20, 22 has its own cover 42a, 42b, 42c. The thermally insulating intermediate pieces 24, 26 are likewise provided with lids 42d, 42e. The adjacent end walls of the lids are preferably provided with recesses (not shown in the drawing) which allow the block 12 with the samples contained therein and the lid 40, if any, to pass and which may be closed by suitable slides. The sequence control may be effected manually, or with the aid of a computer or by means of some other suitable control circuit.

The thermal contact between the sample holder block 12, which operates in the way of a slide, and the thermostatted main blocks or thermostatting bodies 18, 20, 22 may be further improved by the use of pressure springs, lubricants (oil, water), non-thermostatted extra weights or by pressing the slide against the thermostatting bodies 18, 20, 22, under the effect of a vacuum. For example, the portion 44 of the thermostatting bodies, laterally adjacent the groove 28, may be arranged for displacement along the main part of the respective thermostatting body and may be pressed laterally into contact with the sample holder block by means of some suitable means, such as springs, as is illustrated in FIG. 3.

The temperature adjustment being independent of the sample holder block 12, the sample holder block can be easily exchanged. This allows the device to be changed over quickly between different types of samples, for example to plastic reaction vessels of different shapes, or to films carrying a plurality of reaction vessels, similar to microtitre plates.

If two different temperatures are needed only, one of the thermostatting bodies 18, 20, 22 may be omitted. On the other hand, the device may be extended to any desired number of different temperatures, by adding further thermostatting bodies. It is also possible in this connection to provide temperatures higher and/or lower than those required, to which the sample holder block 12 can then be exposed for short periods of time in order to speed up the temperature change. If, for example, a sample holder block having a temperature of 90° Centigrade is to be cooled down to 30° Centigrade, it may be initially cooled down rapidly to a temperature near 30° Centigrade, in a thermostatting body which is maintained at 10° Centigrade, in order to be then moved into the thermostatting body maintained at the desired temperature of 30° Centigrade.

The necessity to provide separate thermostatting means for each thermostatting body may be eliminated according to an improvement of the invention by sizing the insulating layers 24, 26, etc. between the neighboring thermostatting bodies in such a way as to give them a certain thermal conductivity just sufficient to ensure that only the outer thermostatting bodies must be thermostatted, while the thermostatting bodies arranged therebetween are maintained at corresponding intermediate temperatures by the insulating intermediate layers. It should be noted, however, in this connection that the thermal conductivity of the indirectly thermostatted bodies should be greater by at least the power of ten than the thermal conductivity of the intermediate layers, in order to guarantee a substantially uniform temperature of the thermostatting bodies.

Instead of one groove 28, a plurality of grooves may be provided, conveniently in parallel, for accommodating additional sample holder blocks similar to the sample holder block 12, which can be displaced therein either synchronously or independently, so that a plurality of programs can be run simultaneously. The device may also have a circular symmetrical design, in which case the sample holder block is arranged for displacement in a circular groove.

The groove (and, correspondingly, the sample holder block) may also have some other cross-sectional shape; for example, it may be rectangular or have some other configuration, for example the form of a T, enclosing the sample holder block in form-locking engagement.

We claim:

1. Device for setting the temperature of at least one sample to different values, comprising:
    a holder means for receiving said sample, said holder means comprising a thermally conductive sample holder block arrangement provided with recess means for receiving said sample in thermally conductive relationship;

temperature-adjusting means comprising thermostat means adapted to control the temperature to at least two different temperatures, said temperature-adjusting means comprising at least two rigid thermally conductive temperature block means arranged along one coordinate;

transport means for said holder means, said transport means moving said sample holder block arrangement along said coordinate for selectively bringing said sample into thermal contact with any of said temperature-adjusting means; and a control means for controlling said transport means, said control means being adapted for bringing said sample holder block arrangement cyclically and sequentially into contact with said temperature block means for given periods of time, using said transport means.

2. Device according to claim 1, wherein means enhancing the thermal contact are provided which ensure that a thin air layer only is left between the said sample holder block (12) and the respective temperature block (18, 20, 22) when the said sample holder block (12) occupies the position in which it contacts the said temperature block (18, 20, 22).

3. Device according to claim 2, wherein the said means enhancing the thermal contact are adapted to press the said sample holder block (12) against the respective temperature block (18, 20, 22).

4. Device according to claim 1, wherein said temperature block means are thermally insulated from each other by a thermal insulation.

5. Device according to claim 1, wherein said temperature block means are provided with at least one groove in which said sample holder block arrangement is supported in sliding relationship.

6. Device according to claim 5, wherein the said groove (28) encloses the said sample holder block (12) in form-locking engagement.

7. Device according to claim 5, wherein said groove is straight and said transport means comprises a belt-like element, which element is connected to said sample holder block arrangement and is coupled to a drive means.

8. Device according to claim 1, wherein each temperature block means is connected to a thermostat of its own.

9. Device according to claim 1, wherein at least three temperature block means are provided in a row, a thermal insulation having a notable thermal conductivity being arranged between neighboring temperature block means, each of said temperature block means at the ends of said row being connected to a thermostatting means, and said thermal insulation between neighboring temperature block means having a thermal conductivity such that due to the heat transfer said temperature block or said temperature blocks arranged therebetween is (are) maintained at a temperature between the temperatures of said temperature blocks arranged at said ends.

10. Device according to claim 1, wherein each temperature block means is provided with a cover of its own.

* * * * *